United States Patent Office 3,647,813
Patented Mar. 7, 1972

3,647,813
PROCESS FOR THE MANUFACTURE OF BENZOX-AZOLONE-6-β-HYDROXY-ETHYL-SULFONE
Fritz Meininger, Frankfurt am Main, and Reinhard Hahnle, Hofheim, Taunus, Germany, assignors to Farbwerke Hoechst Aktiengesellschaft vormals Meister Lucius & Bruning, Frankfurt am Main, Germany
No Drawing. Filed Mar. 10, 1970, Ser. No. 18,281
Claims priority, application Germany, Mar. 14, 1969, P 19 12 954.5
Int. Cl. C07d 85/28
U.S. Cl. 260—307 C          7 Claims

ABSTRACT OF THE DISCLOSURE

A process for the manufacture of a benzoxazolone-6-β-hydroxyethylsulfone of the Formula II

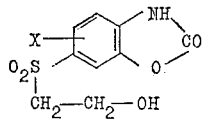

in which X represents hydrogen, chlorine, bromine, lower alkyl or lower alkoxy, which comprises reacting 1 mol of a benzoxazolone-6-sulfinic acid of the Formula III

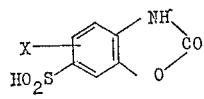

in which X is defined as above, with 1 to 10 mol of ethylene oxide in aqueous medium at a pH-range between about 2 and about 6 at a temperature range between about 10° C. and about 70° C.

---

It is known (a) to condense aromatic, aliphatic or alicyclic sulfinic acids or their salts with halogeno-hydrines and/or 1,2-alkylene oxides and, if desired or required, to esterify in the products obtained any hydroxyl groups that may still be present with mineral or organic acids (U.S. Pat. 2,378,551).

Further it is known (b) to react alkyl- or aryl-sulfinic acids with 1,2-alkylene oxides of cycloalkylene oxides in the presence of acidic catalysts or catalysts having an alkaline reaction, for example small amounts of hydrochloric acid or sulfuric acid to yield polyglycol esters with oily nature (German Pat. 890,343).

Further, there is described in the literature (c) the addition of 1 mol of ethylene oxide to the sodium salt of p-toluene sulfinic acid in aqueous alcoholic solution by adding ethylene oxide while cooling and allowing the cooled solution to stand overnight. After working up of the reaction mixture, the 4-methyl-phenyl-β-hydroxyethyl-sulfone could be separated therefrom in the moderate yield of about 50% of the theory (J. Chem. Soc. 1949, pp. 278–282).

Furthermore, it is known (d) that the 3-carboxyphenyl-β-hydroxy-ethyl-sulfone can be obtained by reacting 3-carboxy-benzene-sulfinic acid with ethylene oxide in alkaline solution (U.S. Pat. 3,098,096).

It has been found that the aforementioned known methods are unsuitable for the preparation of benzoxazolone-6-β-hydroxy-ethyl-sulfone, because the reaction of benzoxazolone-6-sulfinic acid with ethylene oxide according to methods (a) and (b) does not yield defined monohydroxy-alkylation products, according to method (c) only insufficient yields and according to method (d) mainly an easily water-soluble substance (melting point 146–147° C.) which has probably the structure (I)

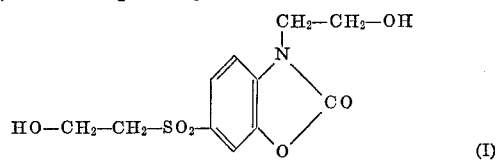

Now, we have found that benzoxazolone-6-β-hydroxy-ethyl-sulfones of the general Formula II

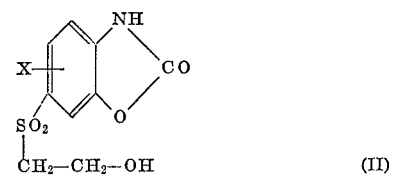

in which X represents a hydrogen or halogen atom such as a chlorine or bromine atom, or an alkyl or alkoxy group, can be obtained in simple manner, with high purity and with good to very good yields, by reacting a benzoxazolone-6-sulfinic acid of the general Formula III

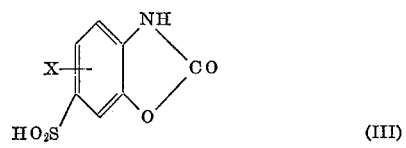

in which X has the meaning given above, with ethylene oxide in an aqueous medium at a pH-value in the range of from about 2 and about 6, preferably at 4.3 to 4.5, and at temperatures in the range of from about 10° C. to about 70° C., preferably at temperatures in the range of from about 40° C. to about 60° C. in this operation, 1 mol of sulfinic acid of the aforementioned general Formula III is reacted with 1 to about 10 mols, preferably 2 to 6 mols, of ethylene oxide.

The reaction is suitably effected by combining an aqueous solution of the sodium salt of the sulfinic acid of the general Formula III with an aqueous solution of ethylene oxide, while maintaining the respective pH-value constant within the indicated range over the whole period of the reaction by adding dilute sulfuric acid. The benzoxazolone-6-β-hydroxy-ethyl-sulfone of the general Formula II that has formed precipitates during the reaction and in this manner evades further, undesired action of the ethylene oxide. Furthermore, it is suitable to carry out the reaction in a pressure vessel in order to prevent the ethylene oxide from escaping and to avoid a loss of yield.

The benzoxazolone-6-β-hydroxy-ethyl-sulfones obtained according to the invention and corresponding to the general Formula II are valuable intermediate products in the manufacture of dyestuffs.

The following examples illustrate the invention:

EXAMPLE 1

A solution of 140 parts by weight of ethylene oxide (3.2 mols) in 600 parts by volume of water was added to a solution of 151 parts by weight of the sodium salt of benzoxazolone-6-sulfinic acid (0.68 mol) in 800 parts by volume of water. The pH-value was adjusted to 4.3 by adding dropwise 20% by weight sulfuric acid and maintained at 4.3 to 4.5 during to total period of the reaction. The whole was heated within one hour to 50° C., while stirring. After 40 minutes, inoculating crystals were introduced. The mixtuer was stirred for 15 hours at 50° C. and for 3 hours at 10° C. The product was then filtered off, washed thrice with 200 parts by volume of water and dried. 135 parts by weight of benzoxazolone-6-β-hydroxyethyl-sulfone (82% of the theory) were obtained. Melting point: 203°–204° C.

EXAMPLE 2

A solution of 140 parts by weight of ethylene oxide (3.2 mols) in 600 parts by volume of water was added to a solution of 176 parts by weight of the sodium salt of 5-methoxy-benzoxazolone-6-sulfinic acid (0.7 mol) in 1000 parts by volume of water. The pH-value was adjusted to 4.3 by adding dropwise a 20% by weight sulfuric acid and maintained during the total period of the reaction at 4.3 to 4.5. The whole was heated within one hour to 50° C., while stirring. After 40 minutes, inoculation crystals were introduced. The mixture was heated for 15 hours at 50° C. and for 3 hours at 10° C. The product was then filtered off, washed thrice with 200 parts by volume of water and dried.

138 parts by weight of 5-methoxy-benzoxazolone-6-$\beta$-hydroxyethyl-sulfone (72% of the theory) were obtained. Melting point: 250–252° C.

The 5-chloro-benzoxazolone-6-$\beta$-hydroxyethyl-sulfone, melting point 218° C., and the 5-methyl-benzoxazolone-6-$\beta$-hydroxy-ethyl-sulfone, melting point 178–180° C., were prepared in analogous manner.

When the reaction was carried out, instead at the pH-value of 4.3 to 4.5, at a pH-value of 3 to 3.5 or 4.5 to 5, the mentioned compounds were likewise obtained with high purity.

We claim:
1. A process for the manufacture of a benzoxazolone-6-$\beta$-hydroxyethylsulfone of the formula

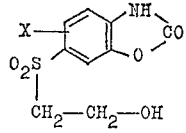

in which X represents hydrogen, chlorine, bromine, lower alkyl or lower alkoxy, which comprises reacting 1 mol of a benzoxazolone-6-sulfinic acid of the formula

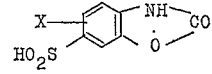

in which X is defined as above, with 1 to 10 mols of ethylene oxide in aqueous medium at a pH-range between about 2 and about 6 at a temperature range between about 10° C. and about 70° C.

2. The process as claimed in claim 1, wherein the reaction is carried out at a pH-range between 4.3 and 4.5 at a temperature range between about 40° C. and about 60° C.

3. The process as defined in claim 2, wherein the molar ratio of the benzoxazolone-6-sulfinic acid to ethylene oxide is 1:2 to 6.

4. The process as defined in claim 3 wherein X is hydrogen.

5. The process as defined in claim 3 wherein X is methoxy.

6. The process as defined in claim 3 wherein X is chloro.

7. The process as defined in claim 3 wherein X is methyl.

References Cited

UNITED STATES PATENTS 3,135,779  6/1964  Hoyer et al. _____ 260—457

ALEX MAZEL, Primary Examiner

R. V. RUSH, Assistant Examiner